US011902858B2

(12) United States Patent
Andre et al.

(10) Patent No.: US 11,902,858 B2
(45) Date of Patent: Feb. 13, 2024

(54) POWER RAMPING OF BEACON SIGNALS TO ENHANCE LOCATION ACCURACY

(71) Applicant: X DEVELOPMENT LLC, Mountain View, CA (US)

(72) Inventors: David Andre, San Francisco, CA (US); Erich Karl Nachbar, Foster City, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 0 days.

(21) Appl. No.: 17/726,647

(22) Filed: Apr. 22, 2022

(65) Prior Publication Data

US 2023/0188940 A1    Jun. 15, 2023

Related U.S. Application Data

(60) Provisional application No. 63/289,713, filed on Dec. 15, 2021.

(51) Int. Cl.
*H04W 4/029* (2018.01)
*H04B 17/318* (2015.01)
(Continued)

(52) U.S. Cl.
CPC .......... *H04W 4/029* (2018.02); *G01S 5/0284* (2013.01); *H04B 17/318* (2015.01); *H04W 52/367* (2013.01)

(58) Field of Classification Search
CPC .. H04W 4/023; H04W 62/367; H04B 17/318; G02S 5/0284
(Continued)

(56) References Cited

U.S. PATENT DOCUMENTS 7,038,584 B2   5/2006 Carter
8,442,553 B2   5/2013 Cardona et al.
(Continued)

FOREIGN PATENT DOCUMENTS

WO   2016076995 A1   5/2016

OTHER PUBLICATIONS

BLE Beacon Indoor Positioning Systems Basics by Locatify | Locatify, downloaded from the internet, https://locatify.com/blog/indoor-positioning-systems-ble-beacons/, Nov. 15, 2021, 11 pages.
(Continued)

*Primary Examiner* — William Nealon
(74) *Attorney, Agent, or Firm* — Botos Churchill IP Law

(57) ABSTRACT

The technology enables locating asset tracking tags based on a ramped sequence of signals from one or more beacon tracking tags. The sequence includes at least one minimum power signal and at least one maximum power signal. Each signal in the sequence has a tag identifier and an initial signal strength value. Each beacon signal in the ramped sequence is associated with the time at which that beacon signal was received by a reader. Each beacon signal is also associated with a received signal strength at reception. A location of the beacon tracking tag is estimated according to the signals in the sequence based on the difference between the initial and received signal strengths. A position of the reader device is identified based on the beacon tag's location. An asset tracking tag location is identified based on the reader's location and packets received by the reader from the asset tag.

20 Claims, 7 Drawing Sheets

(51) Int. Cl.
　　　*H04W 52/36*　　　(2009.01)
　　　*G01S 5/02*　　　(2010.01)

(58) Field of Classification Search
　　　USPC .................................................... 455/456.1
　　　See application file for complete search history.

(56) References Cited

U.S. PATENT DOCUMENTS

| | | | | |
|---|---|---|---|---|
| 8,629,773 | B2* | 1/2014 | Rhie | G01S 5/0226 340/572.1 |
| 8,953,570 | B2 | 2/2015 | Lin et al. | |
| 8,965,411 | B1* | 2/2015 | Busch-Sorensen | G01S 1/08 455/500 |
| 9,778,343 | B2* | 10/2017 | Raynesford | G06K 7/10366 |
| 10,192,416 | B2 | 1/2019 | Emmanuel et al. | |
| 10,571,547 | B2 | 2/2020 | Oh et al. | |
| 2014/0228044 | A1* | 8/2014 | Jones, Jr. | G01S 5/02 342/386 |
| 2016/0065719 | A1* | 3/2016 | Jeong | H04W 12/06 455/420 |
| 2017/0064667 | A1* | 3/2017 | Mycek | H04W 64/00 |
| 2017/0079001 | A1* | 3/2017 | Lewis | H04W 40/244 |
| 2017/0228566 | A1 | 8/2017 | Sengstaken | |
| 2018/0176737 | A1* | 6/2018 | Subramaniyan | H04W 4/025 |
| 2018/0199161 | A1* | 7/2018 | Deora | H04W 4/02 |

OTHER PUBLICATIONS

Gu, et al., Energy-Efficient Indoor Localization of Smart Hand-Held Devices Using Bluetooth, IEEE Access (vol. 3), Date of Publication, Jun. 4, 2015, 25 pages.

Ji, et al, Analysis of positioning accuracy corresponding to the number of BLE beacons in indoor positioning system, Published in 2015 17th International Conference on Advanced Communication Technology (ICACT), date of Conference, Jul. 1-3, 2015, 3 pp.

Jiménez, Finding objects using UWB or BLE localization technology: A museum-like use case, Published in 2017 International Conference on Indoor Positioning and IndoorNavigation (IPIN), Date of Conference Sep. 18-21, 2017, 3 pages.

Kolakowski, et al, UWB/BLE Tracking System for Elderly People Monitoring, Mar. 12, 2020, 22 pages, Warsaw University of Technology, Warsaw, Poland.

Kriz, et al., Improving Indoor Localization Using Bluetooth Low Energy Beacons, Mar. 27, 2016, 11 pages, Dept. of Informatics and Quantitative Methods, Faculty of Informatics and Management, University of Hradec Kralove, Rokitanskeho 62, 500 03 Hradec Kralove, Czech Republic, 11 pp.

Park, et al, A Situation-Aware Indoor Localization (SAIL) System Using a LF and RF Hybrid Approach, Kyungpook National University, 80 Daehakro, Bukgu,Daegu 702-701, Korea, Nov. 10, 2018, 16 pages.

Paul, et al, RSSI-Based Indoor Localization and Tracking Using Sigma-Point Kalman Smoothers, IEEE Journal of Selected Topics in Signal Processing, vol. 3, No. 5, Oct. 2009, 15 pages.

Pšnik, Improved Bluetooth Low Energy Sensor Detection for Indoor Localization Services, Faculty of Electrical Eng. and Computer Science, Univ. of Maribor, 2000 Maribor, Slovenia, Published Apr. 20, 2020, 27 pages.

Qureshi, et al, Evaluating the Implications of Varying Bluetooth Low Energy (BLE) Transmission Power Levels on Wireless Indoor Localization Accuracy and Precision, Department of Computer Science, City University. of Hong Kong, Hong Kong, China, Published Jul. 25, 2019, 28 pages.

Rezazadeh, et al., Transmission Power Adjustment Scheme for Mobile Beacon-Assisted Sensor Localization, IEEE Transactions on Industrial Informatics, 2018, 9 pages.

Sadowski, et al, RSSI-Based Indoor Localization With the Internet of Things, IEEE Access, Jun. 4, 2018, 14 pages, School of Engineering, University of Guelph, Guelph, ON N1G 2W1, Canada.

Spachos, et al, BLE Beacons for Indoor Positioning at an Interactive IoT-Based Smart Museum, School of Engineering, University of Guelph, Guelph, ON, Canada, Jan. 21, 2020, 11 pp.

Tuncer, Indoor localization with Bluetooth technology using Artificial Neural Networks, 2015 IEEE 19th International Conference on Intelligent Engineering Systems (INES), Date of Conference, Sep. 3-5, 2015, 3 pages.

Zanca, et al, Experimental comparison of RSSI-based localization algorithms for indoor wireless sensor networks, Dept. of Information and Engineering, University of Padova, Italy, Apr. 2008, 6 pages.

International Search Report and Written Opinion for Application No. PCT/US2022/043042 dated Dec. 14, 2022 (6 pages).

* cited by examiner

100

200

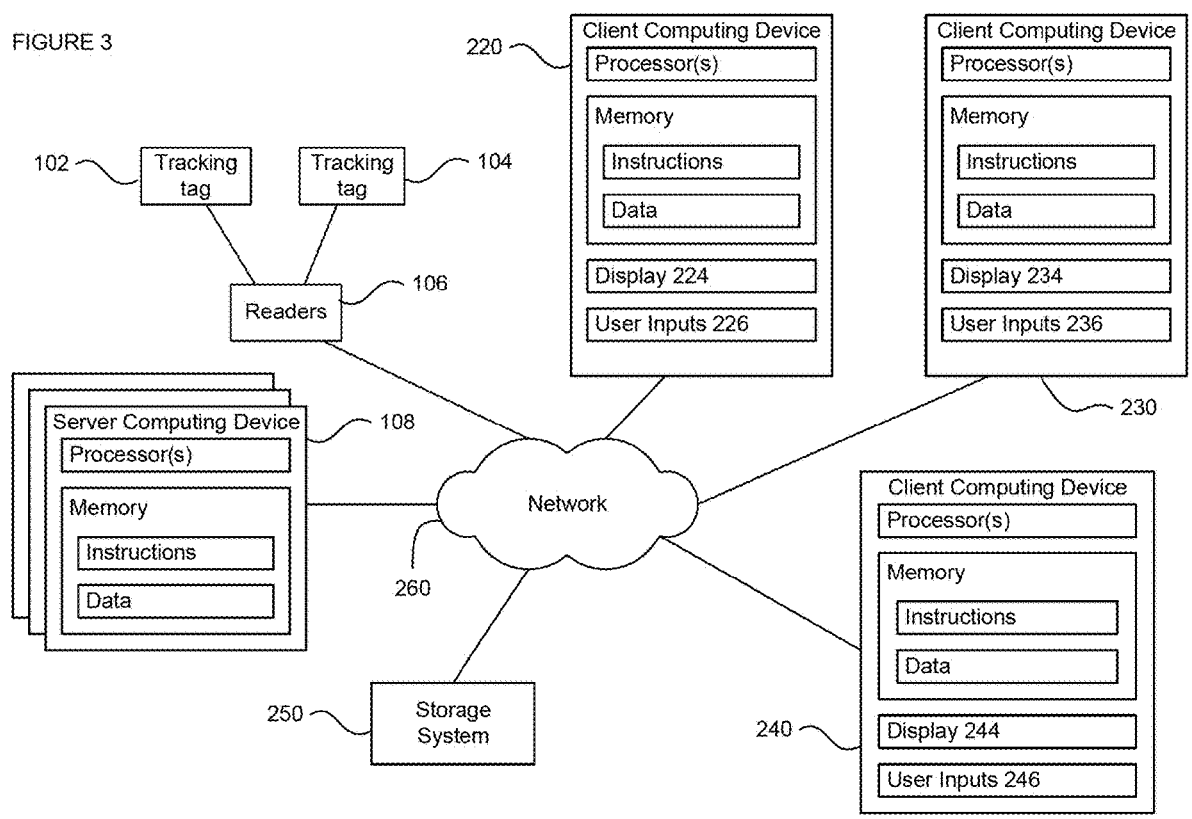

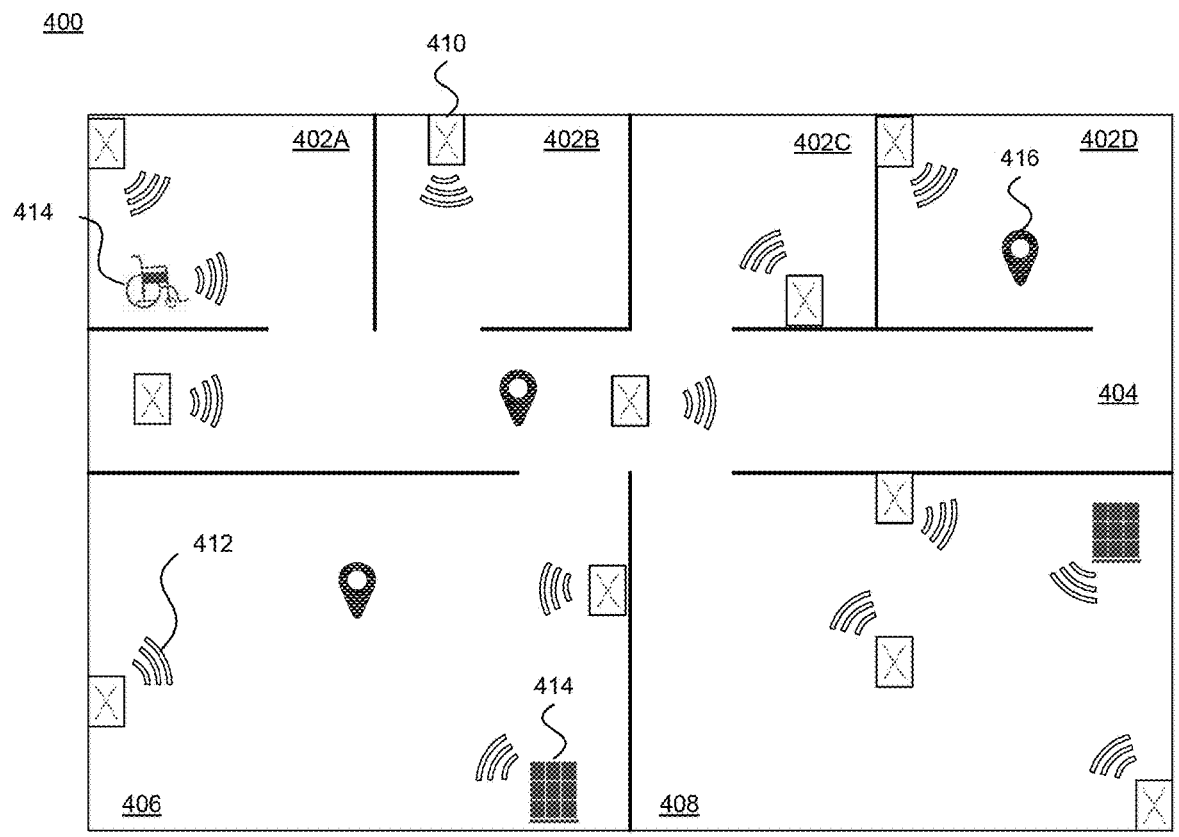

420

500

POWER RAMPING OF BEACON SIGNALS TO ENHANCE LOCATION ACCURACY

CROSS-REFERENCE TO RELATED APPLICATIONS

The present application claims the benefit of the filing date of U.S. Provisional Application No. 63/289,713, filed Dec. 15, 2021, the entire disclosure of which is incorporated by reference herein.

BACKGROUND

The Internet of Things (IoT) is the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes. In addition, systems that use GPS or WiFi may suffer from signal dropout or transmitters going offline, which can reduce the ability to properly identify an object's location.

BRIEF SUMMARY

Aspects of the disclosure provide for enhanced location accuracy of objects via power ramping of beacon signals received by those objects. Beacon tracking tags may be placed in different locations in and around rooms, storage areas, loading docks, etc., and their exact location may not be known or easily identified. For instance, a given beacon tracking tag may be placed in one corner of a conference room, but the system may not know which corner it was placed. By employing power ramping, varying signal propagation information for different signals sent by a given beacon tracking tag is obtained. The system can use such received signal strength information collected by one or more other devices (e.g., readers), along with known or assumed characteristics about the environment, to identify a relative position of the given beacon tracking tag. This can enable better location accuracy for the devices (readers). The readers also receive transmissions from asset tracking tags, which can be placed on various objects (e.g., packages, supplies, equipment, etc.). In turn, the system can use the localization for a particular reader and received signal strength information from asset tracking tags to identify the locations of the asset tracking tags with enhanced confidence.

According to one aspect, a method for locating asset tracking tags comprises: obtaining, by a receiver device, a ramped sequence of beacon signals from a beacon tracking tag, the ramped sequence of beacon signals including at least one minimum power signal and at least one maximum power signal, each beacon signal in the sequence including tag identification information and an initial signal strength value indicating a transmitted power level for that beacon signal; associating, by one or more processors of the receiver device, each beacon signal in the ramped sequence with a timestamp indicating a reception time at which that beacon signal was received by a reader device; associating, by the one or more processors of the receiver device, each beacon signal in the ramped sequence with a received signal strength at the reception time; estimating, by the one or more processors of the receiver device, a location of the beacon tracking tag according to each beacon signal in the ramped sequence based on the difference between the initial signal strength value and the received signal strength for each respective beacon signal; identifying, by the one or more processors, a position of the reader device based on the estimated location of the beacon tracking tag; and identifying, by the one or more processors, a location of an asset tracking tag based on the identified position of the reader device and one or more data packets received by the reader device from the asset tracking tag.

The ramped sequence of beacon signals may be a monotonically changing sequence between the at least one minimum power signal and the at least one maximum power signal. The ramped sequence of beacon signals may include two maximum power signals followed by the at least one minimum power signal. The ramped sequence of beacon signals may include a plurality of equal steps in power level.

Estimating the location of the beacon tracking tag may include performing a nonlinear least squares evaluation of at least some of the beacon signals in the ramped sequence (e.g., any 2 signals in the ramped sequence). Alternatively or additionally, identifying the position of the reader device may include comparing signal strength information obtained by the reader against stored calibration data. Alternatively or additionally, estimating the location of the beacon tracking tag may include performing location filtering so that the location of the beacon tracking tag is probabilistically related to one or more previous estimated positions of the beacon tracking tag. Alternatively or additionally, obtaining the ramped sequence of beacon signals may include obtaining a plurality of ramped sequences of beacon signals, each of the plurality corresponding to a different beacon tracking tag.

According to another aspect, a system is configured to locate asset tracking tags. The system comprises memory configured to store location information for one or more beacon tracking tags, one or more readers, or one or more asset tracking tags. The system also comprises one or more processors configured to: obtain, via a receiver device, a ramped sequence of beacon signals from a beacon tracking tag, the ramped sequence of beacon signals including at least one minimum power signal and at least one maximum power signal, each beacon signal in the sequence including tag identification information and an initial signal strength value indicating a transmitted power level for that beacon signal; associate each beacon signal in the ramped sequence with a timestamp indicating a reception time at which that beacon signal was received by a reader device; associate each beacon signal in the ramped sequence with a received signal strength at the reception time; estimate a location of the beacon tracking tag according to each beacon signal in the ramped sequence based on the difference between the initial signal strength value and the received signal strength for each respective beacon signal; identify a position of the reader device based on the estimated location of the beacon tracking tag; and identify a location of an asset tracking tag based on the identified position of the reader device and one or more data packets received by the reader device from the asset tracking tag.

The one or more processors may be further configured to update the memory with at least one of the estimated location of the beacon tracking tag, the identified position of the reader, or the identified location of the asset tracking tag.

The receiver device may be the reader device. Alternatively, the receiver device is a server computing device in operative communication with the reader device.

BRIEF DESCRIPTION OF THE DRAWINGS

FIG. 3 is a functional diagram of the example network in FIG. 2 in accordance with aspects of the disclosure.

FIGS. 4A-B illustrate example scenarios in accordance with aspects of the disclosure.

DETAILED DESCRIPTION

Example Systems

Accurate localization of objects can be important for a number of reasons, including knowing where supplies or equipment are stored and whether additional materials need to be ordered. In a warehouse setting, once arriving at the warehouse pallets of goods may be moved to different locations depending on storage limitations, when the goods need to be shipped out, and where the goods are going. In a commercial or hospital setting, equipment may be stored in one location (e.g., a storeroom), placed in different rooms for use, and then moved when the need arises, such as moving a hospital bed from one room to another.

Figure 1A:
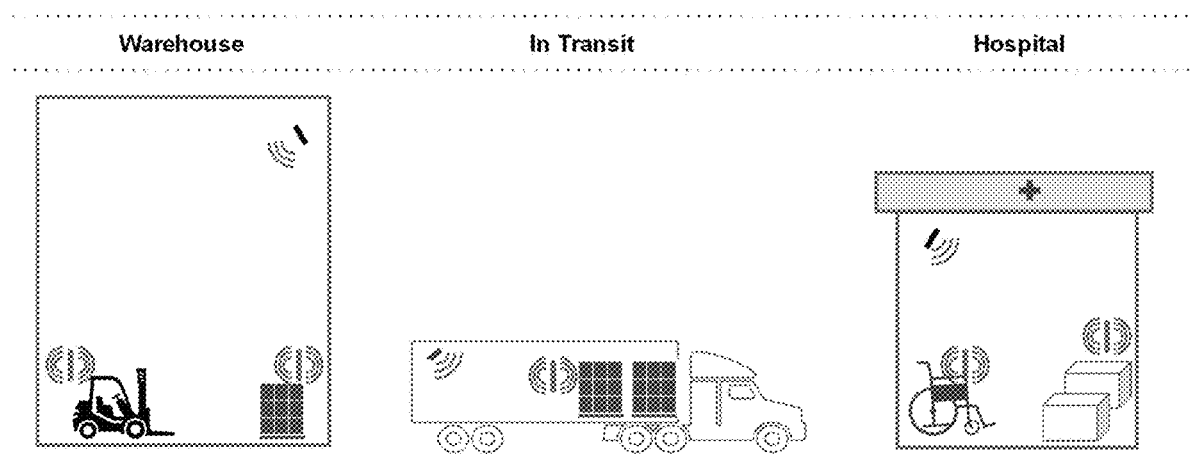
FIG. 1A illustrates various examples for localization of objects in accordance with aspects of the technology.

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck. In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
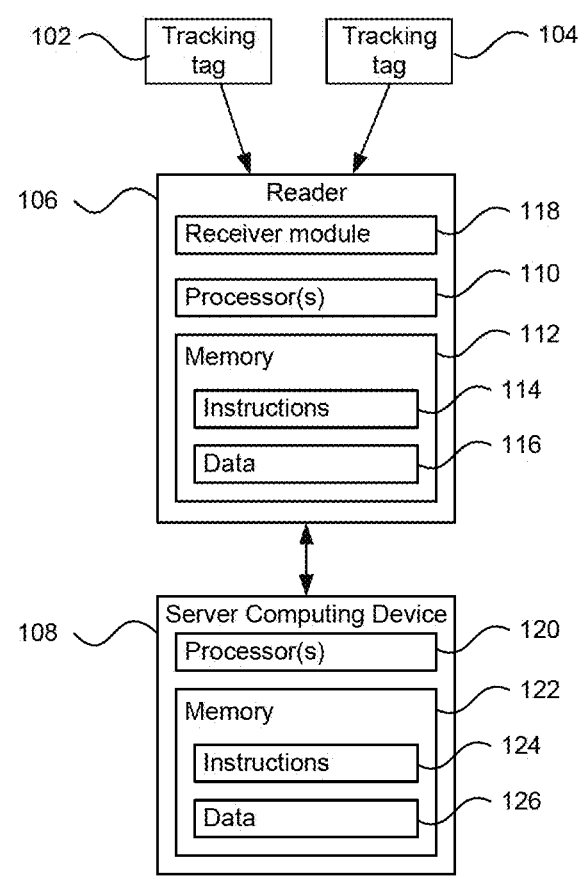
FIG. 1B is a functional diagram of an example tracking system in accordance with aspects of the disclosure.

FIG. 1B is a functional diagram of a tracking system 100. The tracking system 100 may include a plurality of tracking devices, such as tracking tags 102 and 104, and a reader 106. As discussed further below, a server computing device 108 may also be part of the tracking system 100. Each tracking tag may include one or more sensors, an identifier chip (such as for radiofrequency (RF) identification), and/or a transmitting device (such as an RF module configured to transmit information using a selected frequency band and transmission protocol). A tracking tag may be passive, such as a tag configured to activate or be powered by environmental energy, or active, configured to include a battery or be coupled to another power source. A given tracking tag may be placed on or otherwise attached to or inserted into an item to be tracked, like a package, a piece of equipment, a vehicle, a warehouse section, a room, etc. While tracking tags 102 may be associated with assets such as packages, equipment or vehicles (e.g., a forklift or an autonomous fulfillment robot that can retrieve packages from different locations in a warehouse), tracking tags 104 may be beacon tags configured to transmit beacon information from an aisle in a warehouse or from a specific room in a hospital. Different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need it.

The given tracking tag 102 or 104 may emit a signal via an antenna, such as using the transmitting device, to communicate data. The data may be formatted according to the selected protocol and include one or more sensed characteristics of the given tracking tag or its environment. For example, the sensed characteristic may be a temperature, a location, motion, battery conditions, trip/item conditions, and/or other detectable characteristics of the tracking devices or its environment. The transmitting device may send such information via radiofrequency transmission in a selected frequency band, using a standard or proprietary protocol. By way of example, the transmitting device may employ a Bluetooth™ (e.g., a Bluetooth Low Energy (BLE)) or 802.11 protocol in the 2.4 GHz and/or 5 GHz frequency bands. In some examples, each beacon tracking tag and each asset tracking tag uses the Bluetooth™ or BLE protocol.

The reader 106 may be a computing device configured to detect the signals emitted by the plurality of tracking tags 102 and 104, then store and/or transmit data related to the tracking tags. While only one reader is shown in FIG. 1B, the system may employ multiple readers. The reader 106 may include one or more processors 110, memory 112 and other components typically present in general purpose computing devices. The reader 106 includes a receive module 118 having an antenna and a processing section (not shown), which may include a bandpass filter for the frequency band of interest, an analog to digital (A/D) converter, and a signal processing module to evaluate information in received signals. The processing section may also convert the received signal to a baseband signal, before or after A/D conversion.

The one or more processors 110 may be any conventional processors, such as commercially available CPUs or microcontrollers. Alternatively, the one or more processors may be a dedicated device such as an ASIC or other hardware-based processor, such as a field programmable gate array (FPGA). Although FIG. 1B functionally illustrates the processor(s), memory, and other elements of the reader 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the processor(s) 110. The data may include sensed characteristics from any of the tags 102 and/or 104 received by the reader 106. The memory 112 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor(s) 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader 106. In some implementations, one or more tracking devices in the tracking system 100, such as a tracking tag 104, may be configured to obtain and communicate data directly to the server computing devices 108. The server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the processor(s) 120. Data 126 and instructions 124 may be the same or similar type as the data 116 and instructions 114, respectively.

After detecting the signals of one or more tracking tags 102 or 104, the reader 106 may transmit the data from the tracking tags to the server computing devices 108 through an existing connection or through a network. Thus, in this case the reader 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader 106 may include a transceiver including both a receiver and a transmitter, which is configured to receive signals from the tags 102 and 104 and also to send and receive information with the server computing device 108.

The server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than, e.g., 0° C. to 10° C. for 30 minutes and (2) the tracking device is on a trip, which may indicate overheating of a cooled package or storage compartment. A second alert may be set for when (1) no motion is detected for 10 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader 106 and/or the central server 108 through a network.

Figure 2:
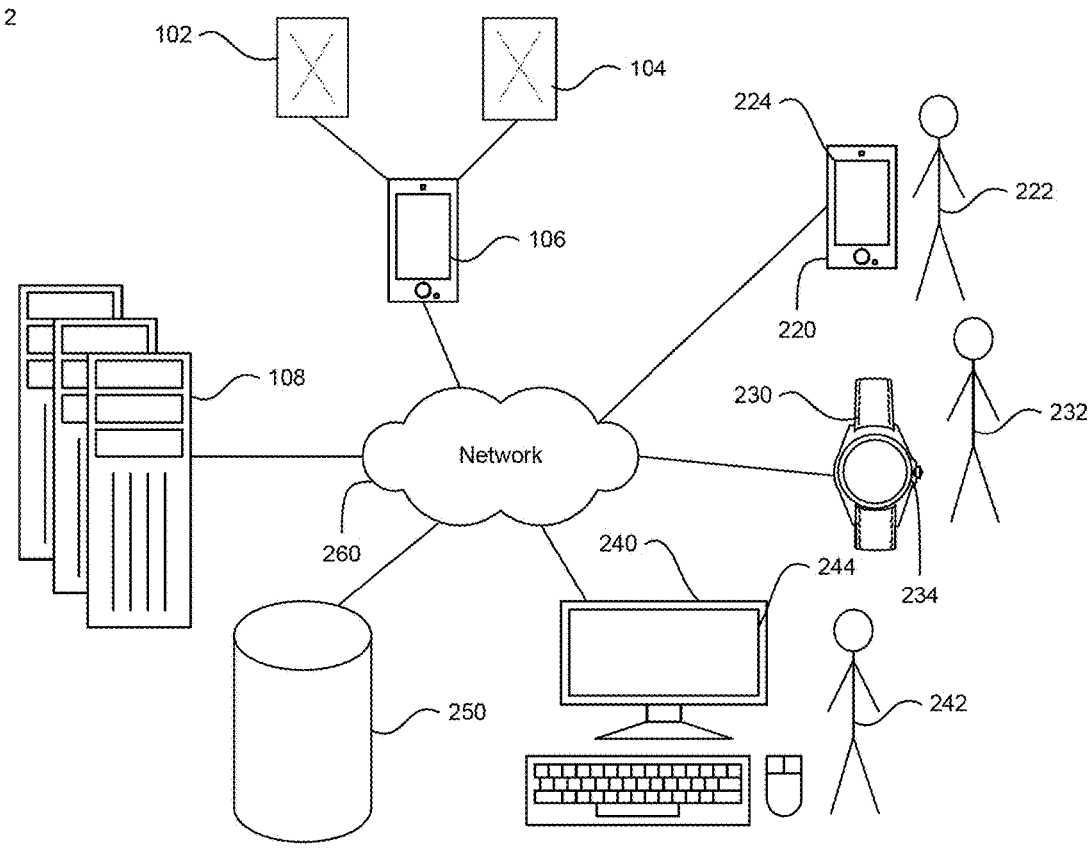
FIG. 2 is a pictorial diagram of an example network in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader 106, and server computing device 108. Although only a few tags and computing devices are depicted for simplicity, a typical system may include significantly more.

Using the client computing devices, users, such as user 222, 232, 242, may view the location data on a display, such as displays 224, 234, 244 of respective computing devices 220, 230, 240. As shown in FIG. 3, each client computing device 220, 230, 240 may be a personal computing device intended for use by a respective user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

FIG. 4A illustrates one example 400 of a system having a number of tracking tags arranged in various locations of a building (e.g., a hospital). In this example, there may be a number of rooms 402, such as patient rooms, along one side of a hallway 404. On the opposite side of the hallway 404 there is a storage room 406, such as to house equipment or supplies, as well as another room 408, which may be a meeting room, common area, rehab facility or the like. One or more beacon tracking tags 410 may be located in each room, including the hallway. Each beacon tracking tag 410 is configured to emit beacon signals 412 (e.g., RF signals in a selected frequency band according to a particular communication protocol). While the beacon signals 412 may appear directional, this need not be the case and the signals may be transmitted omnidirectionally, for instance from a beacon tracking tag 410 that is located on the ceiling, pillar or floor. In some implementations, the beacon tracking tag 410 may be configured to emit RF signals with information associated with its environment (e.g., temperature, humidity, etc.).

In addition to beacon tracking tags 410, there may be asset tags 414 on a variety of items (e.g., a case of supplies as shown in storage room 406 or a wheelchair shown in room 402A). Each asset is also configured to emit RF signals with information associated with that asset (e.g., temperature, motion information, item details, and/or other detectable characteristics of the tracking device or its environment). Readers 416 may be found at various locations in the building, such as in a patient room, the storage room, the hallway or other location. Note that even if transmitted omnidirectionally, the signals from a given beacon tracking tag or an asset tag may be attenuated in a non-uniform manner due to the presence of walls, furniture, floors/ceilings, equipment, etc.

Figure 4B:
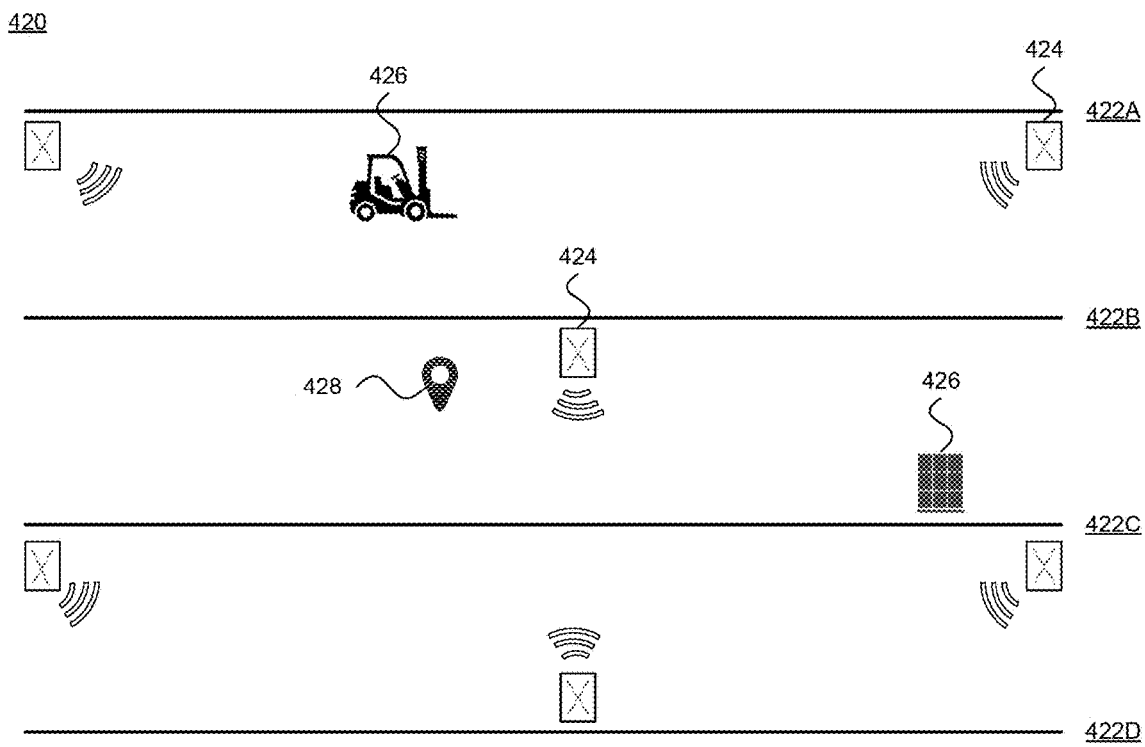

FIG. 4B illustrates another example 420 of a system having a number of beacon tracking tags positioned along different aisles in a warehouse setting. In this example, there are a number of aisles 422A-422D, although there may be more (or fewer) aisles, and the aisles may be arranged in other configurations than what is shown. Here, beacon tags 424 are located at different places for the aisles, such as along aisle endcaps, along the ceiling (or floor), on shelves, storage lockers, cabinets or other places along the aisle, etc. Similar to FIG. 4A, tracking tags 426 are placed on or otherwise associated with different assets, such as a pallet of equipment or a forklift that retries items from their locations in the warehouse. As above, the beacon tracking tags and the asset tracking tags are configured to transmit signals that are detectable by one or more readers 428.

In order to determine the location of a given asset tracking tag, the system uses signal strength information obtained from one or more beacon tracking tags. A series of beacon signals are ramped at different power levels (a ramped sequence). Evaluating the received signals in view of their transmitted power can enable the system to determine which room or other location at which a given beacon tracking tag is located. From that, the system is able to determine a location for a given asset tracking tag (and thus its corresponding item) with a suitable degree of certainty, such as by triangulating its position relative to the relevant beacon tracking tags.

Example Methods

In addition to the aspects described above and illustrated in the figures, various operations will now be described. It should be understood that the following operations do not have to be performed in the precise order described below.

According to one aspect of the technology, a system is configured to determine the location of items having tracking tags (e.g., tags 102 as shown in FIG. 1B). In order to track the items, the system may require the location of the tracking tags on each item, on a package containing multiple items, a pallet storing a number of packages, etc. As discussed herein, the system makes a location determination using beacon transmissions received from one or more tracking tags 104, which are detected by one or more readers 106. The system evaluates changes in beacon signal strength, e.g., by comparing transmitted and received signal strengths for each signal in a ramped beacon sequence, to estimate a location for a given beacon tracking tag. Given this estimate, the location for a reader can be determined (e.g., by triangulation according to multiple beacon tracking transmitters). Then, knowing the location of the reader, the system can readily identify where different assets are located via signals received by the reader from corresponding asset tracking tags. This may take place in an indoor environment, such as a warehouse, in a trailer of a cargo truck, in a room of a hospital, etc. However, in other situations the detection may occur outdoors or in partly enclosed structures.

In one example, each beacon tracking tag transmits a beacon or information signal at regular or defined intervals. The intervals may be every few seconds, every few minutes, or more or less. The beacon transmissions from one or more beacon tracking tags may be received by one or more readers of the system. The readers may be stationary or mobile. The tracking tag transmissions include data such as a tracking tag identifier and the strength of the signal upon transmission by the tracking tag ("initial signal strength" or "transmit power").

Varying the output signal strength in a series of beacon transmissions can result in different received signal strengths at the reader(s). Depending on the building layout (e.g., walls and the materials that are used, placement of packages, equipment and other objects), the output signals will be attenuated to a greater or a lesser amount. At some point the low strength of the transmission may cause the signal to drop into the noise floor, whereby the beacon from the tracking tag will no longer be identifiable. Thus, at a low enough signal level, the tracking tag itself will not be detectable. By analyzing the series of beacon signals and knowing both their initial signal strength (transmit power) and their received signal strength, the system calculates an estimated location of the beacon tracking tag in accordance with the attenuation of each beacon signal in the series. Unlikely locations can be filtered out, for instance by rejecting possible locations that are not physically possible given the layout of the building or other facility. Knowing the (estimated) location of one or more beacons via this process, the server (or reader) can determine the location for the reader (e.g., by triangulation techniques), and then use this to identify the placement for a given asset according to signals received by the reader from the asset's tracking tag.

When transmitting the beacon signals, the beacon tracking tags may selectively alter the initial signal strength for sequentially transmitted signals (a ramped sequence). In one implementation, the initial signal strength of consecutive signals may alternate between a maximum and a minimum power level. For example, the initial signal strength of consecutive signals may alternate between 4 dBm and −20 dBm.

In another implementation, the initial signal strength of consecutive signals may vary incrementally between a minimum to a maximum power level. In one example, the initial signal strength of consecutive signals may increase from −20 dBm to 4 dBm by increments of 4 dBm. In such an implementation, after reaching the maximum value, the next initial signal strength may reset to the minimum value and repeat the incremental power increase. Alternatively, the signals may decrease incrementally from a maximum to a minimum power level. In either scenario, such monotonic changes may include a consistent change in the power level, which may be greater or lesser than 4 dBm. Additionally, in either scenario, after reaching the maximum or minimum value the maximum or minimum initial signal strength may be repeated one or more times prior to decreasing or increasing the subsequent initial strength. The specific approach for adjusting the power levels may be tuned over time at a given site to allow for enhanced disambiguation.

In another implementation, the output signals will transmit at the maximum value twice, then at a minimum value, and then repeat the process for subsequent transmission groups. For example, the initial signal strength of two consecutive signals may be 4 dBm and then the initial power level of the next signal may be −20 dBm and the repeat. The above-described implementations are not an exhaustive list of possible methods of varying the initial signal strength; they are merely examples of possible methodologies.

Each beacon tracking tag may select from a set of programmable power ramping sequences. Each sequence may include a minimum power level, a maximum power level, and the increase (step) from one level to the next. Thus, in one example the minimum power may be −20 dBm, the maximum power may be 4 dBm, and the step may be 4 dBm. Whether the ramp is linear or alternates among specific power levels as discussed above may be stored as a parameter associated with each sequence.

As the beacon tracking tags do not receive return signals from the readers (or the asset tracking tags), and may not monitor other beacon tracking tags, changing the power ramping sequence or timing for when each beacon is transmitted is done independently for each beacon tracking tag.

Upon receipt of a signal from a tracking tag, a reader may timestamp the signal (as the transmissions of the beacons, e.g., one or more data packets, may not include any transmission timestamps) and detect a received signal strength. The timestamp corresponds to the time the signal was received at the reader and the received signal strength is the power level of the signal when received at the reader. In one scenario, the reader may process the information locally, although in other scenarios the reader conveys the signal information (to a central server). The reader transmission includes data such as the tracking tag identifier associated with the tracking tag that sent the beacon, the initial signal strength, the timestamp and the detected received signal strength. In some implementations, the reader is mobile. In such situations, the reader may record an estimate of its own location when the signal is received. Alternatively or additionally, other environmental information may be recorded upon receipt of the signal from the tracking tag (e.g., temperature, humidity or changes thereto) can be recorded. All of this information may be sent to the central server.

The central server processes the data from the reader to make a location determination for the tracking tag that sent the beacon (or the reader may process the data locally). In one implementation, the central server may do this by, for example, calculating a distance between the beacon tracking tag and the reader based on the received signal strength (and/or the difference between the received signal strength relative to its initial signal strength) over at least one timestep, where the distance is a function of the received signal strength. The central server may utilize data containing the same beacon tracking tag identifier (i.e., corresponding to the same tracking tag and associated item) from multiple readers. The central server may repeat the distance calculation for the received signal strength over at least one timestamp received from the multiple readers. The central server may then make a location determination based on the calculated relative distances between each reader and the beacon tracking tag.

In another implementation, the central server may make a location determination based on a comparison of the received signal strength to calibration data. Calibration data contains previously calculated, estimated received signal strength values that correspond to locations within the operational range of the system with respect to the one or more readers of the system. The estimated received signal values may be determined by, for example, calculating an estimated received signal strength value based on a distance between a reader and a location, where the estimated received signal strength value is a function of distance and the reader location is known. Additionally, the calibration data may include, and account for, environmental information (e.g., temperature, humidity, barometric pressure, etc.) and a map of the operational area of the system. In some implementations, the central server may account for environmental information by comparing the information received from a tracking tag, reader, or both to known environmental conditions in an operational area of the system and determine locations within the operational area of the system where the received information agrees with the known conditions. The system may assign a higher probability (e.g., increase the probability) that the tag and or reader is in a determined location based on the agreement of environmental conditions. Such a determination may additionally be used in a room or floor location determination discussed in more detail below.

After receiving data from a first reader containing a first received signal strength, the central server can compare the first received signal strength to the calibration data. Based on the comparison, the central server determines the distance between the first reader and the tracking tag at a first timestamp. The central server may repeat the comparison for a second received signal strength from a second reader at the first timestamp corresponding to the same tracking tag. The central server may repeat the comparison with additional received signal strengths from additional readers at the first timestamp corresponding to the same tracking tag, such as according to a multi-lateration process. For example, a milti-lateration process may include location specific information such as a sitemap, including for example obstacle and reader locations, and characteristics regarding individual rooms contained in the sitemap. The characteristics may include measured values such as temperature. In some situations, the multi-lateration process may utilize the probabilistic approach described in more detail below. The central server may then make a location determination with increased precision based on the comparison between each reader and the tracking tag. The comparison may be repeated at additional timestamps.

In one aspect, the system may approximately estimate a log likelihood of a given tracking tag being in each "cell" of a grid that can be virtually imposed on the location (e.g., one floor of a building). This may employ a Bayes-style approach, based on a linear mapping of received signal strength to distance. Refinement can be via location filtering so that a beacon's location is probabilistically related to its previous estimated positions (e.g., using a Kalman filter). Then by taking the ramped transmission powers from the beacons into account, the system can obtain higher quality locations for the beacons, which enable for enhanced location determination of the readers and, ultimately, tracking tags associated with various other objects (assets). According to one scenario, the system may learn identifying signatures of beacon tracking tags using machine learning from the ramped power and a set of measurements from an area of interest.

In another aspect, beacon-reader calibration allows the system to build a probabilistic model around the error tolerances of noisy received signal strength readings (from beacon to reader). Receiver filtering can be performed, which allows the system to combat noisy signals by dynamically weighting/removing readings that are outside expected ranges. Then an iterative Gauss Newton method for nonlinear least squares (NLLS) can be used to find the optimal location prediction as a function of the remaining readings from the reader(s).

In this approach, a Bayesian estimation can be performed, using a priori information about the devices based on manufacturer tolerances, where the likelihood is identified via data collected offsite. This results in a posterior distribution (e.g., p(distance | observed rssi) for noisy received signal strength (RSSI) readings versus distance per receiver (reader). Receiver (reader) dynamic filtering can involve median-mean filtering across a time window for each reader-beacon pair to filter out noisy values. It can also include thresholding for known/acceptable beacon-reader distance measurements. For example, each time an inference is run, the system can filter out distance measurements that are unrealistic and/or have changed widely in time (e.g., a change of 100 meters in 0.5 seconds from one measurement to the next). This may provide another layer of robustness against noise (e.g., due to temporary moving forklifts, humans walking around with electronics, etc.).

The NLLS approach can be framed as an optimization task, where the system seeks to minimize the error across all observed data points. For instance:

$$\|\in\|^2 = \Sigma_n (rssi\_distance - \|\vec{x} - \overrightarrow{reader}\|)^2 \quad (2)$$

where rssi_distance is the noisy distance from the reader to the beacon, $\overrightarrow{reader}$ are the static (known) coordinates of the reader (or other receiver during testing), and z are the unknown beacon coordinates. The system finds the x that minimizes the above error. The problem can be linearized so that the Gauss Newton iterative method can be employed via a Taylor Series expansion on the error term. The process can be iterated until convergence is reached (e.g., the norm of difference between successive estimates of x is below a selected threshold) or the maximum number of iterations is reached. The maximum number of iterations can be selected according to a tradeoff between liveliness versus accuracy per client needs.

In some implementations, the location determination includes detection of an obstacle between the tracking tag and the one or more readers. The central server may first use the data from the one or more readers to make a location estimation. The central server may do this, for example, based on a comparison of the received signal strength to calibration data. Calibration data contains previously calculated estimated received signal strength values that correspond to locations within the operational range of the system with respect to the one or more readers. The estimated received signal strength values are determined by, for example, calculating an estimated received signal strength based on a distance between a reader and a location, where the estimated received signal strength is a function of distance and the reader location is known. Additionally, the calibration data may include, and account for, information such as temperature, humidity, and/or a map of the operational area of the system. By way of example, the map may be a floor plan, building blueprints, a digital map or the like.

After receiving data from the first reader containing a first received signal strength, the central server compares the first received signal strength to the calibration data. Based on the comparison, the central server determines an apparent distance between the first reader and the tracking tag at a first timestamp. The central server may then make a first apparent location determination. The central server may repeat the comparison for a second received signal strength received at the first timestamp from a second reader and make a second apparent location determination. If the first and second apparent location determinations do not agree, the comparison is repeated for a third received signal strength received at the first timestamp from a third reader to make a third apparent location determination. If the third apparent location determination agrees with the first apparent location determination, the central server determines there is an obstacle between the second reader and the tracking tag. Conversely, if the third apparent location determination agrees with the second apparent location determination, the central server determines there is an obstacle between the first reader 106a and the tracking tag. Thus, intervening obstacles can be identified either because signals that would normally be received are not, or higher power signals may be received at a lower-than-expected signal strength (e.g., just based on a straight signal attenuation calculation). In such an implementation, the locations of the readers within the system are known. In some situations, when a detected obstacle is stationary for a period of time (e.g., 5-10 minutes or more or less), an estimation of obstacle size or makeup may be determined. For example, if an obstacle (e.g., a desk, bookcase or pallet of equipment) is present in an operational area between a tracking tag and a first reader, the central server may determine a first apparent location determination between the first reader and the tracking that differs from a second and third location determination between a second and third reader and the tracking tag, where there are no obstacles between the second and third readers and the tracking tag. The differing apparent location determinations is due to the signal attenuation caused by the obstacle. Based on the differing apparent location determination the central server may determine there is an intervening obstacle between the first reader and the tracking tag.

In some implementations, the obstacle detection includes determining if the tracking tag and a reader are in the same room, on the same floor or both. As noted above, calibration information may include a map of the operational area of the system. If the detected obstacle corresponds to the location of a known obstacle contained in the map of the operational area of the system, such as a wall, floor or piece of industrial equipment (e.g., elevator bank, HVAC system, etc.), the central server may determine that the detected obstacle is the known obstacle. By way of example, signals received at the reader from the tag at the lowest power setting can indicate that both devices are in the same room. Received signal information from other readers known to be in different rooms (or floors) could be evaluated to validate this indication. For instance, if reader A in a first room does not detect a tag's signal sent at the lowest power setting at a given timestamp, but reader B does detect the tag's signal at that timestamp, then the system may assign a high probability (e.g., 80-95% or higher) that the tag is in the same room as reader B. In some implementations, the determination of if the tracking tag and reader are in the same room, on the same floor, or both may include a comparison of environmental information. For example, the central server may compare environmental information received from a tracking tag, reader, or both to known environmental conditions in an operational area of the system and determine locations within the operational area of the system where the received information agrees with the known conditions. The system may assign a higher probability (e.g., increase the probability) that the tag and or reader is in a determined location based on the agreement of environmental conditions.

In some implementations, the central server may use proximity data in obstacle detection, including the determination of whether the tracking tag and a reader are in the same room, on the same floor, or both. Proximity data may be generated by a reader or tracking tag interacting with a device, mobile or stationary, known to be in a particular room or floor (e.g., laptop, desktop, stationary medical device, etc.). The proximity data may be generated when the tracking tag or reader is within a certain distance of the device (e.g., 1-4 meters, or more or less). In some implementations, the proximity data might be generated as a result of the interaction of one or more ultrasonic speakers and one or more microphones of the tracking tag and/or the reader with one or more ultrasonic speakers and one or more microphones of the device. The ultrasonic speakers and microphones may be limited in range to a particular room as the ultrasonic waves are significantly attenuated but walls and/or floors of a room, allowing verification of position within the same room and floor of the tracking tag and/or reader to the device.

In some implementations, proximity data may be used in conjunction with the multi-lateration approach described above in the obstacle determination, including the determination of if the tracking tag and a reader are in the same room, on the same floor, or both. For example, if, based on the proximity data, a tracking tag or reader is determined to be in a particular room and/or floor, the multi-lateration approach is updated with the determination and limits its computational area to the particular room and/or floor. In one situation, if a partial multi-lateration was done that suggested that a signal should be present at a room in which there is no signal, then either the target object is actually at another location or there is an obstacle in the room preventing detection of the target object. If other targets are found in this situation, then a likelihood that the target object is in that room may be reduced.

According to one aspect, location tracking can be performed as follows. In a single prediction window (e.g., between 1-20 minutes), if the number of packets received for a single transmission rate is less than a minimum sample count (the minimum number of packets received in order to perform the evaluation, such as at least 3-7 packets), then the received signal strength values for that transmission rate are ignored. If it is more than the minimum sample count, the system aggregates RSSI values using an aggregation function to generate a single smooth RSSI value. The aggregation function may be, e.g., a MAX function that returns a largest value from the set of RSSI values.

One algorithm includes the following operations. First, fetch data corresponding to a given prediction window for a single beacon. Then aggregate RSSI values for each transmission rate separately using the approach described above. Then use the aggregated RSSI values to obtain a distance estimate of a given beacon to each reader. Then get an initial estimate of beacon position by a grid search process using distance estimates (see below). The initial estimate can then be fed into an NLLS method as a starting estimate. The NLLS method uses this initial estimate and the distance estimates to further optimize beacon position prediction.

The distance estimation can be done according to a machine learning algorithm, in which the goal is to estimate the distance of the beacon from each reader using RSSI values for different transmission rates. For each transmission rate, a separate regression algorithm is trained. For example, for tx=−20, a regression model may be trained using RSSI values for tx=−20 transmission rate, where the RSSI values are the predictor variable and the distance is the target variable. This approach considers the priority of transmission rates. For instance, the following is one example priority order: −20>−16>−12>−8>−4>0>2>4. The above priority order indicates that the regression model for tx=−20 is preferred over the regression model for tx=−16 and so on. The rationale for such a priority order is that the spread of RSSI for tx=−20 for a given distance interval may be narrower compared to the RSSI for tx=4. In a given prediction window, distance can be estimated using only one regression model for a single tx. The regression model can be chosen based on the priority described above. Thus, in a given prediction window, if one were able to get an aggregated RSSI value for tx=−20, the regression model for tx=−20 will be used for making a prediction, otherwise the system tries to use the regression model for tx=−16 and then so on.

Once the system has estimates of distances from beacon to readers, the next stage is to find a point in continuous space which best fits those distance estimates. For a grid search, the system may divide the 3D space into 1 meter×1 meter×1 meter cubes (or larger or smaller cubes) based on the dimensions of the location of interest. Each cube is represented by its centroid and the error for each cube is calculated using equation (1) as set forth above.

Finally, once the locations of different tracking tags, including beacon-type tags and asset-type tags, those locations can be stored in a database such as database 250 of FIG. 2. As readers obtain more recent information (e.g., received beacons or data packets from assets), the locations of tags in the database can be updated accordingly. In some instances, when a beacon tag is first placed at a location, a user may enter its location information XY coordinates relative to the building's origin and height relative to the floor the beacon tag is on. Such XY coordinates may be converted to latitude/longitude (with or without height or other elevation information such as the floor or level).

Figure 5:
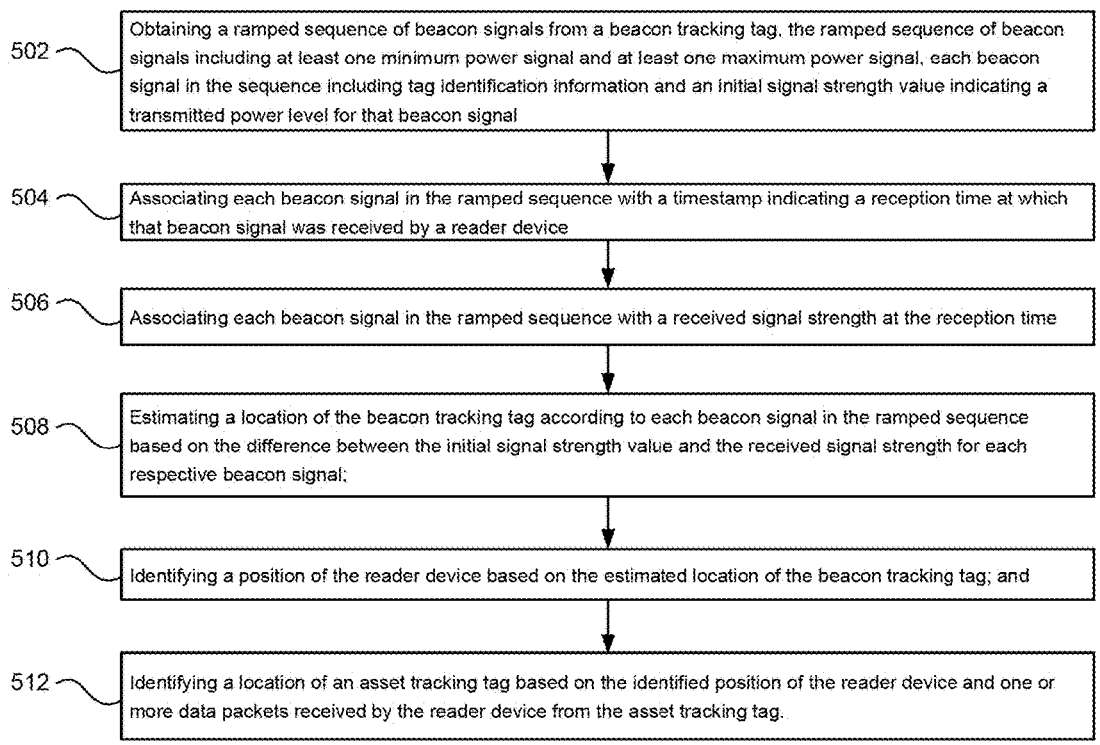
FIG. 5 illustrates an example method in accordance with aspects of the disclosure.

In view of the above, FIG. 5 illustrates an exemplary method 500 for locating asset tracking tags. At block 502, the method includes obtaining, by a receiver device, a ramped sequence of beacon signals from a beacon tracking tag. The ramped sequence of beacon signals includes at least one minimum power signal and at least one maximum power signal, and each beacon signal in the sequence includes tag identification information and an initial signal strength value indicating a transmitted power level for that beacon signal. At block 504, the method includes associating, by one or more processors of the receiver device, each beacon signal in the ramped sequence with a timestamp indicating a reception time at which that beacon signal was received by a reader device. At block 506, the method includes associating, by the one or more processors of the receiver device, each beacon signal in the ramped sequence with a received signal strength at the reception time. At block 508, the method includes estimating, by the one or more processors of the receiver device, a location of the beacon tracking tag according to each beacon signal in the ramped sequence based on the difference between the initial signal strength value and the received signal strength for each respective beacon signal. At block 510, the method includes identifying, by the one or more processors, a position of the reader device based on the estimated location of the beacon tracking tag. And at block 512 the method includes identifying, by the one or more processors, a location of an asset tracking tag based on the identified position of the reader device and one or more data packets received by the reader device from the asset tracking tag.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for locating asset tracking tags, the method comprising:
   obtaining, by a receiver device, a ramped sequence of beacon signals from a beacon tracking tag, the ramped sequence of beacon signals including at least one minimum power signal and at least one maximum power signal, each beacon signal in the sequence including tag identification information and an initial signal strength value indicating a transmitted power level for that beacon signal, wherein the beacon tracking tag is attached to a fixture of an environment;
   associating, by one or more processors of the receiver device, each beacon signal in the ramped sequence with a timestamp indicating a reception time at which that beacon signal was received by a reader device;
   associating, by the one or more processors of the receiver device, each beacon signal in the ramped sequence with a received signal strength at the reception time;
   estimating, by the one or more processors of the receiver device, a location of the beacon tracking tag according to each beacon signal in the ramped sequence based on the difference between the initial signal strength value and the received signal strength for each respective beacon signal;
   identifying, by the one or more processors, a position of the reader device based on the estimated location of the beacon tracking tag; and
   identifying, by the one or more processors, a location of an asset tracking tag based on the identified position of the reader device and one or more data packets received by the reader device from the asset tracking tag.

2. The method of claim 1, wherein the ramped sequence of beacon signals is a monotonically changing sequence between the at least one minimum power signal and the at least one maximum power signal.

3. The method of claim 1, wherein the ramped sequence of beacon signals includes two maximum power signals followed by the at least one minimum power signal.

4. The method of claim 1, wherein the ramped sequence of beacon signals includes a plurality of beacon signals varying incrementally in power level.

5. The method of claim 1, wherein estimating the location of the beacon tracking tag includes performing a nonlinear least squares evaluation of at least two of the beacon signals in the ramped sequence.

6. The method of claim 1, wherein identifying the position of the reader device includes comparing signal strength information obtained by the reader device against stored calibration data.

7. A method for locating asset tracking tags, the method comprising:
   obtaining, by a receiver device, a ramped sequence of beacon signals from a beacon tracking tag, the ramped sequence of beacon signals including at least one minimum power signal and at least one maximum power signal, each beacon signal in the sequence including tag identification information and an initial signal strength value indicating a transmitted power level for that beacon signal;
   associating, by one or more processors of the receiver device, each beacon signal in the ramped sequence with a timestamp indicating a reception time at which that beacon signal was received by a reader device;
   associating, by the one or more processors of the receiver device, each beacon signal in the ramped sequence with a received signal strength at the reception time;
   estimating, by the one or more processors of the receiver device, a location of the beacon tracking tag according to each beacon signal in the ramped sequence based on the difference between the initial signal strength value and the received signal strength for each respective beacon signal;
   identifying, by the one or more processors, a position of the reader device based on the estimated location of the beacon tracking tag, identifying of the position of the reader device includes comparing signal strength information obtained by the reader device against stored calibration data and the comparing includes performing a second comparison for a second received signal strength obtained by a second reader device at the reception time and corresponding to the beacon tracking tag; and
   identifying, by the one or more processors, a location of an asset tracking tag based on the identified position of the reader device and one or more data packets received by the reader device from the asset tracking tag.

8. The method of claim 1, wherein estimating the location of the beacon tracking tag includes performing location filtering so that the location of the beacon tracking tag is probabilistically related to one or more previous estimated positions of the beacon tracking tag.

9. The method of claim 1, wherein obtaining the ramped sequence of beacon signals includes obtaining a plurality of ramped sequences of beacon signals, each of the plurality corresponding to a different beacon tracking tag.

10. The method of claim 1, wherein obtaining the ramped sequence of beacon signals from the beacon tracking tag further includes receiving a set of environmental information from the beacon tracking tag.

11. The method of claim 1, further comprising identifying, by the one or more processors, the presence of an intervening obstacle based on either the received signal strength at the reception time, or an absence of a signal received by the receiver device.

12. The method of claim 1, wherein identifying the location of the asset tracking tag includes identifying at least one of a room or a floor of the asset tracking tag.

13. A system configured to locate asset tracking tags, the system comprising:
   memory configured to store location information for one or more beacon tracking tags, one or more readers, or one or more asset tracking tags, wherein the one or more beacon tracking tags are attached to a fixture of an environment of the system; and
   one or more processors configured to:
   obtain, via a receiver device, a ramped sequence of beacon signals from a beacon tracking tag, the ramped sequence of beacon signals including at least one minimum power signal and at least one maximum power signal, each beacon signal in the sequence including tag identification information and an initial signal strength value indicating a transmitted power level for that beacon signal;
   associate each beacon signal in the ramped sequence with a timestamp indicating a reception time at which that beacon signal was received by a reader device;
   associate each beacon signal in the ramped sequence with a received signal strength at the reception time;
   estimate a location of the beacon tracking tag according to each beacon signal in the ramped sequence based on the difference between the initial signal strength value and the received signal strength for each respective beacon signal;
   identify a position of the reader device based on the estimated location of the beacon tracking tag; and
   identify a location of an asset tracking tag based on the identified position of the reader device and one or more data packets received by the reader device from the asset tracking tag.

14. The system of claim 13, wherein the one or more processors are further configured to update the memory with at least one of the estimated location of the beacon tracking tag, the identified position of the reader, or the identified location of the asset tracking tag.

15. The system of claim 14, wherein the receiver device is the reader device.

16. The system of claim 14, wherein the receiver device is a server computing device in operative communication with the reader device.

17. The system of claim 13, wherein the ramped sequence of beacon signals:
   is a monotonically changing sequence between the at least one minimum power signal and the at least one maximum power signal;
   includes two maximum power signals followed by the at least one minimum power signal; or includes a plurality of equal steps in power level.

18. The system of claim 13, wherein estimation of the location of the beacon tracking tag includes at least one of:
   performance of a nonlinear least squares evaluation of at least some of the beacon signals in the ramped sequence; or
   performance of location filtering so that the location of the beacon tracking tag is probabilistically related to one or more previous estimated positions of the beacon tracking tag.

19. The system of claim 13, wherein obtaining the ramped sequence of beacon signals includes obtaining a plurality of ramped sequences of beacon signals, each of the plurality corresponding to a different beacon tracking tag.

20. A non-transitory computer readable storage medium having instructions stored thereon, the instructions, when executed by one or more processors, causing the one or more processors to implement a method for locating asset tracking tags, the method comprising:
   obtaining, via a receiver device, a ramped sequence of beacon signals from a beacon tracking tag, the ramped sequence of beacon signals including at least one minimum power signal and at least one maximum power signal, each beacon signal in the sequence including tag identification information and an initial signal strength value indicating a transmitted power level for that beacon signal, wherein the beacon tracking tag is attached to a fixture of an environment;
   associating each beacon signal in the ramped sequence with a timestamp indicating a reception time at which that beacon signal was received by a reader device;
   associating each beacon signal in the ramped sequence with a received signal strength at the reception time;
   estimating a location of the beacon tracking tag according to each beacon signal in the ramped sequence based on the difference between the initial signal strength value and the received signal strength for each respective beacon signal;
   identifying a position of the reader device based on the estimated location of the beacon tracking tag; and
   identifying a location of an asset tracking tag based on the identified position of the reader device and one or more data packets received by the reader device from the asset tracking tag.

* * * * *